April 1, 1952     S. S. SHOUP     2,591,622
BEARING MOUNTING

Filed Nov. 13, 1947     3 Sheets-Sheet 1

INVENTOR.
Stanley S. Shoup
BY
C. Verne Martin
ATTORNEY

April 1, 1952 — S. S. SHOUP — 2,591,622
BEARING MOUNTING
Filed Nov. 13, 1947 — 3 Sheets-Sheet 2

INVENTOR.
Stanley S. Shoup
BY C. Verne Martin
ATTORNEY

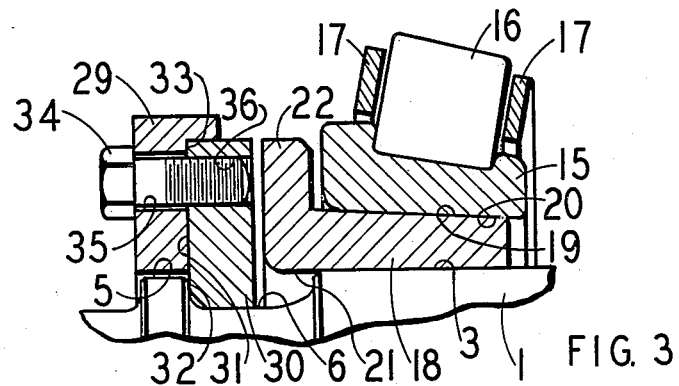
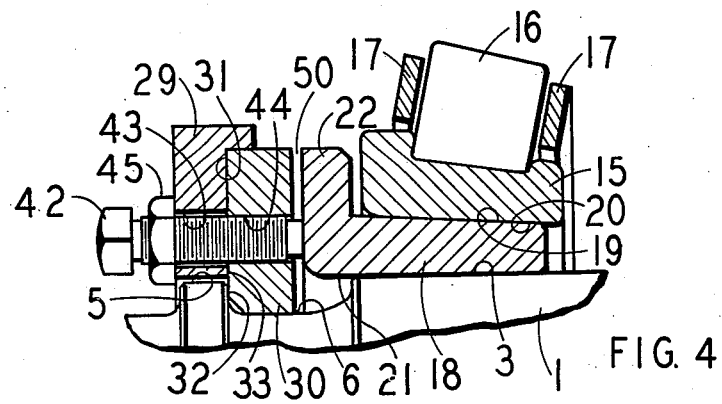
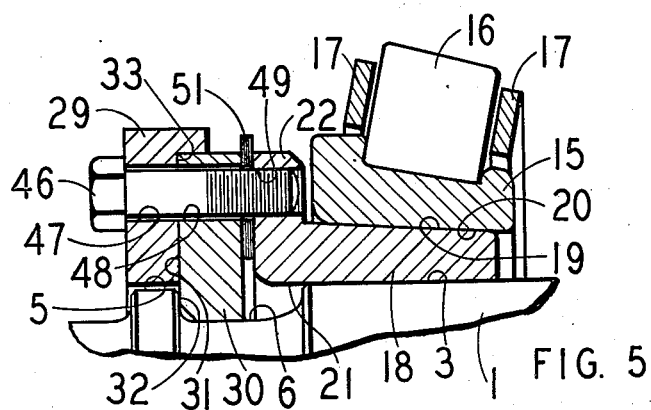

Patented Apr. 1, 1952

2,591,622

UNITED STATES PATENT OFFICE 2,591,622

BEARING MOUNTING

Stanley S. Shoup, Toledo, Ohio, assignor to The National Supply Company, Pittsburgh, Pa., a corporation of Pennsylvania Application November 13, 1947, Serial No. 785,685

6 Claims. (Cl. 308—207)

This invention relates to the mounting of a tapered roller cone bearing assembly upon a shaft or other supporting member wherein the bearing is subjected to an intermittent radial impact loading due to a reversal of the imposed load at substantially regular timed intervals.

Tapered roller cone bearings used for heavy duty construction, such as with mud pumps used in the oil fields, locomotive side rods, power presses and the like where there is a complete reversal of the application of the impact load at definite intervals, must be securely mounted upon the shaft or supporting member to preclude any possible radial movement that would cause the bearing to lose contact with the shaft and slap or pound upon the reversal of the impact load.

Such bearings are usually preloaded at assembly upon the shaft or supporting member to eliminate any possible diametral or radial clearance that might develop on the unloaded side of the bearing due to the elastic characteristics of the material from which such bearings are made and to further insure the maintenance of bearing surface contact at all times. Not only are the bearings preloaded, but they must be preloaded a definite amount to overcome any tendency to creep. Care must be taken to keep within the elastic limit of the material used when preloading, however, sufficient preloading is necessary to slightly deform the roller contact surfaces such that when the load is relieved on one side, the bearing will still be in intimate contact with the shaft on the unloaded side. This reduces the violence of the shock during the reversal of the load and materially increases the life of the bearing.

The principal object of my invention is to provide a means to preload a two row double cup tapered roller bearing mounting subjected to intermittent radial impact loading due to a cyclic reversal in the direction of the applied load.

Another object of my invention is to provide a backing for the entire bearing area of the outer end surface of the outer cone of a preloaded two row double cup tapered roller cone bearing mounting subjected to a uniformly timed reversal of the applied load.

Another object of my invention is to provide a uniform pressure on the entire inner circumference of the outer cone of a preloaded tapered roller cone bearing mounting subjected to a regulated reversal of the imposed load.

Another object of my invention is to provide a means to maintain the initial preloaded condition of a tapered roller cone bearing subjected to intermittent impact loading.

Another object of my invention is to provide a smooth, quiet operating bearing subjected to an intermittent radial impact loading.

Further objects and advantages of my invention will become apparent and in part specifically referred to in the description and specification to follow, which taken in conjunction with the accompanying drawings discloses the preferred and alternate forms of apparatus in accordance with my invention. It should be understood, however, that the disclosure is illustrative of the principles of my invention in its broader aspects.

Fig. 3 is an enlarged fragmental view partly in section taken on the line 3—3 of Fig. 1 showing the means used to secure the split buttress ring and the outer annular ring together as a unit.

Fig. 4 is an enlarged fragmental view partly in section taken on the line 2—2 of Fig. 1 illustrating the relative position of the split buttress ring and the outer cone of the bearing mounting after the preloading operation and prior to the insertion of the annular segmental shims.

Fig. 5 is an enlarged fragmental view partly in section taken on the line 5—5 of Fig. 1 showing the means employed to retain the segmental shims in their operative position and to enable the operator to check the assembly to make sure the bearing is in its proper preloaded position.

Figure 1:
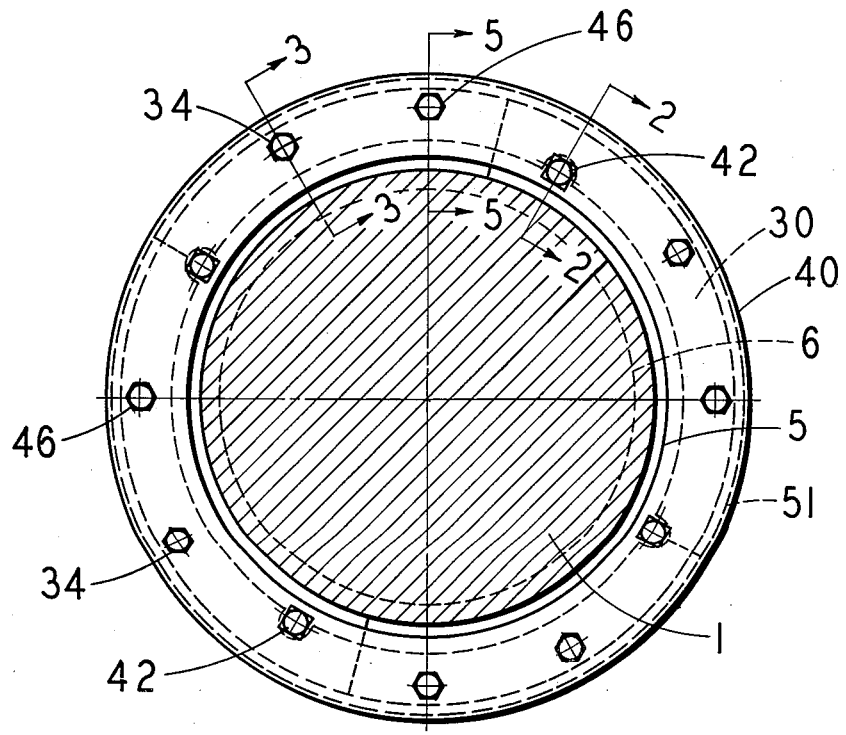
Fig. 1 is an end view of my bearing mounting assembled on a shaft or other supporting member.
Figures 6, 7:
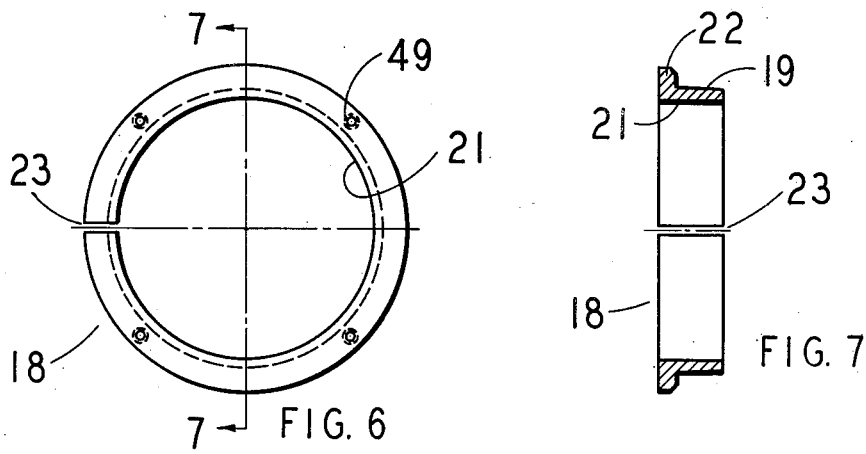
Fig. 6 is an end view of the slit sleeve, drawn to a reduced scale.
Fig. 7 is a sectional view taken on the line 7—7 of Fig. 6 showing the slit in the sleeve, drawn to the same scale as Fig. 6.

In the drawings the numeral 1 designates the crank shaft or supporting member upon which is mounted a two row double cup tapered roller cone bearing subjected to intermittent radial impact loading due to a regulated reversal of an imposed load. The shaft 1 is provided with a plurality of annular surfaces 2, 3, 4, 5 and 6 of different diameters upon which certain elements of the bearing and retainer assembly are mounted. The inner cone 7, including the rollers 8 and cages 9, is pressed upon the annular surface 2 of the shaft 1 and abuts against the shoulder 10 on the shaft 1.

The inner and outer cups 11 and 12 of the bearing assembly are pressed into the bore 13 of the connecting rod end 14. This sub-assembly is next slid in place over the inner cone assembly 7, 8 and 9.

The outer cone 15, including the rollers 16 and cages 17, is assembled upon a longitudinally slit sleeve 18 having an outer peripherial surface 19, which tapers inwardly for a greater portion of its length to conform to the tapered bore 20 of the outer cone 15. The bore 21 of the slit sleeve 18 is of such internal diameter as to slidably fit upon the annular surface 3 of the shaft 1. The sleeve 18 is further provided with an integral radial flange 22 extending beyond the tapered peripherial surface 19 and is slit as at 23 to provide a means to permit the sleeve 18 to be axially advanced into intimate contact with the shaft 1 while the roller 16 of the outer cone assembly is caused to forcefully bear against the tapered bore 24 of the outer cup 12 as the bearing is preloaded in a manner to be presently described.

A split closure ring 25 is secured in oil tight relation to the rearward end of the connecting rod end 14 through a plurality of cap screws 26 and shims or gaskets 27 and is further provided with an oil seal about the annular surface 4 of the shaft 1 through the sealing rings 28.

I provide a new and novel means to positively secure the bearing mounting upon the shaft 1 and to definitely eliminate any chance for radial movement of the bearing with respect to the shaft due to the intermittent radial impact loading to which the shaft is subjected in consequence of a regulated timed reversal of the imposed load. A solid ring 29 is positioned on the annular surface 5 of the shaft 1. A split buttress ring 30, made in halves, is inserted in place upon the annular surface 6 of the shaft 1 and is provided with a surface 31 to bear against the shoulder 32 on the shaft 1 and the inner radial surface 33 in the counterbore of the solid ring 29. The surfaces 31, 33 and the shoulder 32 must be maintained normal to the axis of the shaft 1 in order that equal pressure may be applied to the outer cone 15 through the slit sleeve 18. The rings 29 and 30 are secured together as a unit by means of a plurality of cap screws 34 extending through holes 35 in the ring 29 and the aligned tapped holes 36 in the split buttress ring 30 as shown in Fig. 3. A solid closure ring 37 is secured in oil tight relation to the forward end of the connecting rod end 14 through a plurality of cap screws 38 and shims or gaskets 39 and is further provided with an oil seal about the outer surface 40 of the ring 29 through the sealing rings 41.

*Procedure to be followed in assembling my preloaded bearing mounting*

After the rings 29 and 30 have been firmly secured together to function as a single unit, a plurality of pressure actuating elements in the form of dog point set screws 42 are inserted in the holes 43 in the ring 29 and into the aligned tapped holes 44 in the split buttress ring 30 and tightened slightly. A lock nut 45 is positioned on the screws 42 to enable them to be locked in any given position. Cap screws 46 (Fig. 5) are next inserted through the holes 47 and 48 in the rings 29 and 30 respectfully and the aligned tapped holes 49 in the slit-sleeve 18 to line up the sleeve. These screws are not securely tightened but just drawn up enough to align up the parts.

The dog point set screws 42 are next screwed up snugly against the radial flange 22 of the slit-sleeve 18. Further pressure on the screws 42 against the sleeve 18 causes the sleeve to slightly advance longitudinally of the shaft 1 enough to firmly secure the bearings against radial movement within the connecting rod end 14 but not enough to preload or distort the bearing. The space 50 shown in Fig. 4 indicates the shim gap which at this time should be carefully measured.

Figure 2:
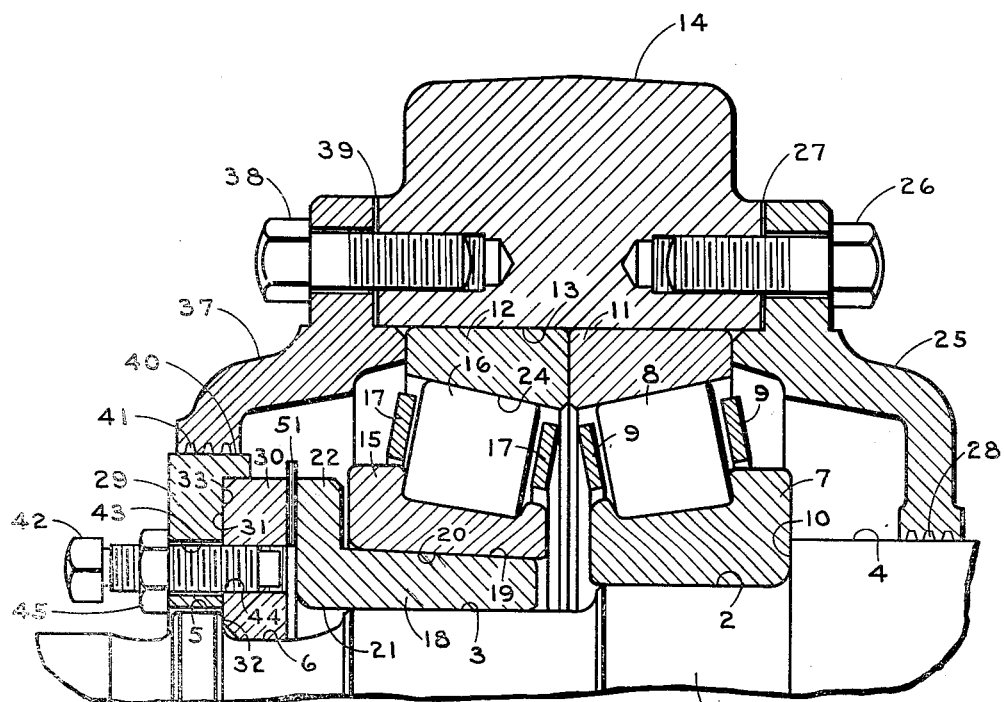
Fig. 2 is an enlarged view partly in section taken on line 2—2 of Fig. 1 showing the mounting of a two row double cup tapered roller cone bearing in its operative position on a shaft.

After the amount of preload to be applied to the bearing has been determined (for example use .015″), tighten the dog point set screws 42 until the shim gap is equal to the space 50 plus .020″. The bearing will then be over-preloaded by .005″. This over-preloaded condition is necessary to insert the segmental shims 51 (shown in Figs. 2, 5 and 8) which should be of a thickness equal to the space 50 plus .015″. Unscrew the cap screws 46 enough to insert the segmental shims 51 in the space 50 and then replace the screws 46 which serve to retain the segmental shims in place.

Next take the load off the dog point set screws 42 and tighten the lock nut 45 at this back-off position, locking the screws 42 in their inoperative position. Now tighten the cap screws 46 until the shims 51 bear against the end face of the flange 22 and are securely held in their position in the shim gap space 50. At this point there is a possibility of a clearance of .005″ between the end surface 31 of the split buttress ring 30 and the shoulder 32 on the shaft 1, which clearance represents the difference between the final thickness of the shims 51 and the shim gap space 50 following the over-preloaded condition.

Two or more of the cap screws 46 are now in a position to be removed, if desired, and longer screws may be inserted in their place and tightened up against the outer cone 15 to pull the rings 29 and 30, the shims 51 and the slit sleeve 18 backwards longitudinally of the axis of the shaft 1 until the surface 31 of the buttress ring 30 bears against the shoulder 32 on the shaft 1. This action will eliminate the .005″ overpreload. If this procedure does not pull the sleeve 18, and its related parts mentioned above, back the .005″ due to excessive friction, the prevailing condition is still satisfactory and workable. If friction does not carry the load, the ring 30 will automatically slip back to the position where the surface 31 of the ring 30 will bear against the shoulder 32 on the shaft 1 and the surface 33 in the counterbore of the annular ring 29 and the original .015″ preloaded condition will be maintained.

Should it be necessary to remove the bearing use the following procedure. Loosen the cap screws 46 until the threads are fully disengaged from the radial flange 22 of the slit sleeve 18 and pull the screws past the shims 51. Next over-preload the bearing .005″ or more by tightening the set screws 42 against the face of the radial flange 22. Remove the shims 51 and next take the load off the dog point set screws 42. Rotate the rings 29 and 30 so that all the screws 34, 42 and 46 may be removed. Remove the rings 29 and 30. The cap screws 46 may be used to break the joint between the bearings and the tapered slit sleeve 18.

Figure 8:
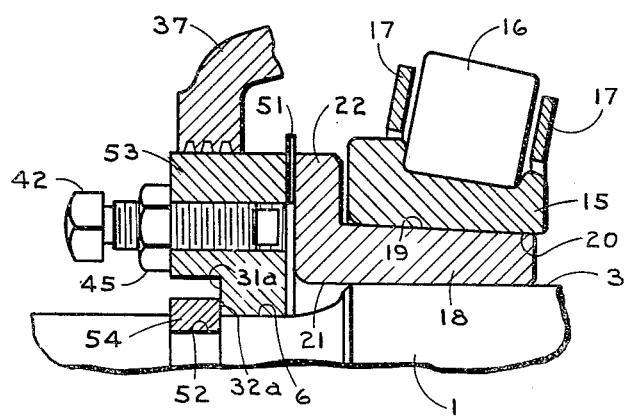
Fig. 8 is an enlarged fragmental view partly in section taken on the line 2—2 of Fig. 1 and similar to Fig. 2, but illustrating an alternate construction providing for the use of a snap ring in a groove in the shaft to provide a shoulder against which a solid buttress ring abuts.

An alternate form of my invention is shown in Fig. 8. In this construction the shaft 1 is provided with a sharp shouldered recess 52 whose shoulders are normal to the axis of the shaft, in lieu of the surface 5 and the shoulder 32. The annular ring 29 and the split buttress ring 30 are consolidated into a solid buttress ring 53 which is slidably mounted upon the annular surface 6 of the shaft 1 and extending beyond the recess 52. This buttress ring 53 is held in place by a snap ring 54 positioned in the recess 52. The portion of the ring 54 extending above the shaft diameter 6 forms a shoulder 32a for the end surface 31a of the buttress ring 53 to bear against and serves as an anchorage for the buttress ring. It will be noted that the shoulder 32a must be normal to the axis of the shaft 1 in order that pressure may be evenly exerted against the sleeve 18 and hence uniformly distributed over the entire surface of the outer cone 15. The balance of the construction shown in Fig. 8 operates in the same manner as that described in the preferred construction disclosed above.

While my invention has been disclosed as carried out by the apparatus of the above described specific construction, it should be understood that many changes may be made therein without departing from the spirit of the invention in its broader aspects and I do not wish to be limited or restricted to the specific details set forth but wish to reserve to myself any further embodiments, modifications and variations that may appear to those skilled in the art or fall within the scope of the appended claims.

Having fully disclosed my invention, what I claim as new and desire to secure by United States Letters Patent is:

1. A preloaded taper roller cone bearing mounting subjected to radial load reversal, journaled between shoulders on a shaft including, an outer cone having a tapered bore, a longitudinally slit sleeve mounted for axial movement upon said shaft and projecting through said cone and provided with an inwardly tapering conical peripherial surface for a greater portion of its length conforming to the tapered bore of said cone and terminating in a radial flange portion beyond said cone, a buttress ring mounted on said shaft in axial alignment with said sleeve and bearing against one of said shoulders, a plurality of set screws threadably extending through said ring and abutting against said flange to preload said bearing mounting to a definite amount and shims of a predetermined thickness interposed between said radial flange and said ring to provide a backing for the entire bearing area of said flange and to maintain the preloaded condition of said bearing mounting as established by said preloading means.

2. A preloaded taper roller cone bearing mounting journaled between shoulders on a shaft and subjected to intermittent radial impact loading due to a reversal of the imposed load at substantially regular timed intervals, including an outer cone having a tapered bore, a longitudinally slit sleeve mounted for axial movement upon said shaft and projecting through said cone and provided with an inwardly tapering conical peripherial surface conforming to the tapered bore of said cone and extending beyond the outer end of said cone and terminating in a radial flange portion beyond said cone, a buttress ring mounted on said shaft in axial alignment with said sleeve and bearing against one of said shoulders, means to preload said bearing mounting to a definite amount and segmental shims equal in thickness to the amount of preload interposed between said radial flange and said ring to provide a uniform pressure on the entire inner circumference of said cone and to maintain the preloaded condition of said bearing mounting as established by said preloading means.

3. A preloaded taper roller cone bearing mounting journaled between shoulders on a shaft and subjected to intermittent radial impact loading due to load reversal, including an outer cone having a tapered bore, a longitudinally slit sleeve mounted for axial movement upon said shaft and provided with an inwardly tapering conical peripherial surface conforming to the tapered bore of said cone and terminating in a radial flange portion beyond said cone, a buttress ring mounted on said shaft in axial alignment with said sleeve and bearing against one of said shoulders, means to preload said bearing mounting to a definite amount and means including shims equal in thickness to the axial displacement due to said preloading interposed between said flange and said ring to maintain the preloaded condition of said bearing mounting as established by said preloading means.

4. A mounting for a tapered roller cone bearing journaled between shoulders on a shaft and provided with an outer cone having a bore, the combination therewith of means including a slit sleeve positioned in the same radial plane as the outer cone, a buttress ring mounted on said shaft in axial alignment with said sleeve and bearing against one of said shoulders, said sleeve being movable axially with respect to said cone and a plurality of pressure actuating elements engaging said sleeve to adjustably position said bearing in a preloaded condition, the same means being adapted to momentarily over-preload said bearing and shims interposed between said ring and said sleeve to retain said bearing in its preloaded condition independent of said original preloading means.

5. A mounting for a tapered roller cone bearing journaled between shoulders on a shaft and provided with an outer cone having a bore, the combination therewith of means comprising a slit sleeve and a buttress ring mounted on said shaft in axial alignment, said sleeve being axially movable on said shaft, said ring bearing against one of said shoulders and a plurality of set screws axially bearing against said sleeve to initially preload said bearing, the same means being adapted to momentarily over-preload said bearing and segmental shims inserted between said ring and said sleeve to retain the initial preload of said bearing and to relieve the load on said preloading means.

6. A mounting for a tapered roller cone bearing journaled between shoulders on a shaft and provided with an outer cone having a bore, the combination therewith of means including the outer cone and a buttress ring mounted on said shaft in axial alignment, said cone being axially movable on said shaft and said ring bearing against one of said shoulders and a plurality of pressure actuating elements engaging said cone to adjustably position said bearing in a preloaded condition upon said shaft, the same means being adapted to momentarily over-preload said bearing and means interposed between said ring and said cone to retain said bearing in its preloaded condition independent of said original preloading means.

STANLEY S. SHOUP.

REFERENCES CITED

The following references are of record in the file of this patent:

UNITED STATES PATENTS

| Number | Name | Date |
| --- | --- | --- |
| 1,693,325 | Preist | Dec. 25, 1928 |
| 1,813,315 | Peterman | July 7, 1931 |
| 1,928,109 | McCormick | Sept. 26, 1933 |
| 2,332,684 | Armitage | Oct. 26, 1943 |